United States Patent [19]

Fragnito

[11] Patent Number: 4,875,389
[45] Date of Patent: Oct. 24, 1989

[54] CHAIN DRIVEN, CONTINUOUSLY INFINITE VARIABLE SPEED TRANSMISSION SYSTEM

[76] Inventor: Frank Fragnito, 11 Holmes Ave., North Babylon, N.Y. 11703

[21] Appl. No.: 121,867

[22] Filed: Nov. 17, 1987

Related U.S. Application Data

[63] Continuation-in-part of Ser. No. 468,324, Mar. 23, 1983, Pat. No.

[51] Int. Cl.[4] .............................................. F16H 9/26
[52] U.S. Cl. ........................................ 74/689; 74/681; 474/53
[58] Field of Search .................. 74/191, 192, 193, 681, 74/689, 690; 474/47, 53

[56] References Cited

U.S. PATENT DOCUMENTS

| | | | |
|---|---|---|---|
| 1,446,294 | 2/1923 | Healey | 474/53 |
| 1,650,449 | 11/1927 | Jaeger | 474/53 |
| 2,344,341 | 3/1944 | Coen | 474/53 |
| 2,455,483 | 12/1948 | Harry | 474/53 |
| 6,790,076 | 7/1901 | Johnston | 474/53 |

FOREIGN PATENT DOCUMENTS

| | | | |
|---|---|---|---|
| 170525 | 2/1952 | Fed. Rep. of Germany | 74/690 |
| 172512 | 9/1952 | Fed. Rep. of Germany | 74/690 |
| 539362 | 6/1922 | France | 74/689 |
| 418214 | 2/1947 | Italy | 74/192 |

*Primary Examiner*—Rodney H. Bonck
*Assistant Examiner*—David A. Testardi
*Attorney, Agent, or Firm*—Stanley Ira Laughlin

[57] ABSTRACT

A chain driven and receiving, continuously infinite variable speed transmission system comprising a pair of cones positioned in the same plane with the smaller diameter of each cone in proximity with the larger diameter of the other and encircled by a continuous flexible chain having pins extending therefrom for engagement and disengagement with spiral gears on the cones positioned in grooves parallel to the longitudinal axes of the cones. Either of the cones may be driven and the chain transmits the power to the other cone at a speed determined by the position of the chain relative to the cones. The system employs a planetary gear system for zero and reverse rotation of the variable speed output from the driven cone.

8 Claims, 3 Drawing Sheets

CHAIN DRIVEN, CONTINUOUSLY INFINITE VARIABLE SPEED TRANSMISSION SYSTEM

BACKGROUND OF THE INVENTION

This patent application is a continuation in part of application Ser. No. 06/468,324, filed Mar. 23, 1983 abandoned Sept. 17, 1985 and application Ser. No. 06/776,835 filed Sept. 17, 1985, abandoned as of the filing date of this application. The filing dates of Mar. 23, 1983 and Sept. 17, 1985 are claimed for the common subject matter pursuant to 35 USC 120.

This invention relates to machine elements and mechanisms in general, and more particularly variable speed changing mechanisms as classified in Class 74, subclasses 191, 208, 283, 325, 348, 405, 461, 689, and 793.

The use of cone-shaped or conical gears is well-known as evident in the following U.S. Pat. Nos.:

| Patent Number | Patentee |
| --- | --- |
| 787,080 | W. C. Conant |
| 789,924 | J. H. Macon, Jr. |
| 798,737 | F. W. Lindgren et al |
| 886,191 | D. M. Dearing |
| 889,333 | G. L. Reenstierna |
| 950,055 | A. Pusterla |
| 994,037 | J. O. Schwartz |
| 1,022,845 | W. H. J. Hipple |
| 1,431,649 | L. D. Gillette |
| 1,515,955 | A. P. Knill |
| 2,208,148 | M. Schafer |
| 2,423,323 | J. T. Janette |
| 2,435,122 | A. Berndt |
| 2,779,204 | M. A. Belluscio |
| 2,889,716 | R. B. Doty |
| 3,018,668 | B. S. Berquist |
| 3,270,576 | D. G. Goldwasser |
| 3,381,544 | J. W. Butler |
| 3,422,702 | H. E. Novinger |
| 3,442,156 | H. E. Novinger |
| 3,442,157 | H. E. Novinger |
| 3,503,279 | P. M. Sievert et al |

U.S. Pat. No. 787,080 to W.C. Conant teaches a variable speed gearing structure employing an internal tooth conical shaped gear and an eccentric rotatable tooth wheel engaged with and moved along the longitudinal axis of the internal conical shaped gear for implementing the various output speeds of the device.

U.S. Pat. No. 789,924 to J.H. Macon, Jr. Dec'd teaches a variable speed gearing device comprising a driving conical gear having a driven moveable friction gear to implement the required speed changes.

U.S. Pat. No. 798,737 yto F.W. Lindgren et al teaches the employment of a moveable friction gear driving an obliquely positioned shaft by means of a cone shaped gear.

U.S. Pat. No. 886,191 to D.M. Dearing teaches a variable speed gear device comprising a combination of bevel and friction gears orthogonally positioned for operation.

U.S. Pat. No. 889,333 to G.L. Reenstierna teaches a variable speed power transmission mechanism employing a rotatable conical gear having a plurality of apertures over its peripheral surface and a gear having a plurality of pins extending from its surface and meshing parallel with the apertures of the surface of the conical gear.

U.S. Pat. No. 950,055 to A. Pusterla teaches a transmission system employing a frictional conical gear that is moved to mate with a conical interior surface of a sprocket for a chain drive.

U.S. Pat. No. 994,037 to J.O. Schwartz teaches a power transmitting device employing frictionally engaged moveable cones for varying the speed and direction of the driven shaft.

U.S. Pat. No. 1,022,845 to W.H.J. Hipple teaches variable speed gearing structure comprising mating friction gears operating on the driving and driven shafts which are first coupled through a cone shaped friction gear for bringing the driven shaft up to the speed of the driving shaft, after which the cone shaped gear is moved away and the input and output shafts are directly coupled through the friction gears which can be joined together.

U.S. Pat. No. 1,431,649 to L.D. Gillette teaches a variable speed gearing structure employing a moveable double cone having the ends with the largest diameters abutting and driving a pair of shafts driven by individual friction gears contacting the peripheral surfaces of the double cone.

U.S. Pat. No. 1,515,955 to A.P. Knill teaches a variable speed transmission structure employing another variation of the double conical gear wherein the double conical gear having the ends having the largest diameters abut; one cone section having transitional teeth between gear sections for bridging and the other section having grooves for guiding the clutching mechanism.

U.S. Pat. No. 2,208,148 to M. Schafer teaches a change speed gear structure wherein a chain drive provides for the engagement and disengagement of a spur gear with a conical gear having a number of different gear sets designed with transitional means for moving from one set to the other without clutching.

U.S. Pat. No. 2,423,323 to J.T. Janette teaches a variable speed transmission structure comprising a driven moveable conical gear for driving a pivotally mounted friction gear.

U.S. Pat. No. 2,435,122 to A. Berndt teaches a variable speed control structure comprising a conical gear with a spur gear affixed to its large diameter end which meshes with a spur gear orthogonally mounted on the driving shaft and affixed to a friction gear used in bringing the driven shaft up to speed prior to the meshing of the spur gears.

U.S. Pat. No. 2,779,204 to M.A. Belluscio teaches a gear transmission structure comprising an equally spaced longitudinal tooth conical gear which meshes with a double fixed tooth spur gear mechanically coupled to provide variable spacing.

U.S. Pat. No. 2,889,716 to R.B. Doty teaches a variable and reversing power transmission structure employing planetary gears in conjunction with mechanically variable diameter pulleys on the input and idler shafts so that whenever the diameter of the pulleys are changed to effect a changed speed ratio, the idler shaft is moved away from or towards the input shaft to compensate for the change in the length of the belt.

U.S. Pat. No. 3,018,668 to B.S. Berquist teaches a speed ratio gearing structure comprising a pair of meshed conical gears, one of which has teeth extending longitudinally from one end to the other, and the other of said gears provided with a number of teeth segments extending longitudinally in a spiral configuration of less than 360 degrees for restricted rotation of the gears when meshed.

U.S. Pat. No. 3,270,576 to D.G. Goldwasser teaches a friction drive power transmission structure producing variable speed outputs with a constant speed input by employing a conical gear driving a moveable friction gear employing a number of rollers over its periphery for longitudinal movement along the conical gear.

U.S. Pat. No. 3,381,544 to J.W. Butler teaches a variable ratio gearing structure partially employing a plurality of resiliently depressible segments for engaging a mating gear.

U.S. Pat. No. 3,422,702 to H.E. Novinger teaches an infinitely variable speed transmission structure employing a spiral gear having a surface lying between circles of different diameters with uniformly sized curved teeth throughout their length and of progressively varying radius of curvature equally distantly spaced between consecutive teeth.

U.S. Pat. No. 3,442,156 to H.E. Novinger teaches an infinitely variable speed gear transmission structure employing a spiral gear having an internal surface comprised of uniformly sized curved teeth that are equidistantly spaced throughout their lengths and driving an helical gear fixed to the output shaft; said helical gear having a plurality of helical gears mounted around.

U.S. Pat. No. 3,442,157 to H.E. Novinger teaches an infinitely variable speed gear transmission structure employing uniformly sized curved teeth equidistantly spaced throughout their lengths driving planetary gears fixed to the output shaft.

U.S. Pat. No. 3,503,279 to P.M. Sievert et al teaches a variable and reversing power transmission structure employing planetary gears in conjunction with mechanically variable diameter pulleys on the input and planetary sun gear shafts so that whenever the diameter of one of the pulleys is changed, the other is oppositely changed resulting in an unchanged belt length.

The Science & Mechanics article on pages 66 through 69 of the 1977 Fall/Winter edition entitled "Variable Speed Traction Transmission" teaches a structure that distinguishes from Applicant's invention because three friction cones are employed in a planar configuration wherein the outer upper and outer lower cones are identically positioned and driven by a chain whose sprockets are affixed to the ends of these cones having the smaller diameters. The middle cone is positioned opposite to the other cones and is driven by the cones through intermediate idler friction gears for introducing variable speed control.

The Popular Science article on pages 83 through 86 of the March, 1980 edition entitled "Traction-Drive Transmission" teaches a structure that distinguishes from Applicant's invention because a double cone having the largest diameter of each cone abutting for driving a nutating shaft in oil to transmit torque. The article also describes a planetary gear structure having more than one level of orbiting gears.

The Popular Science article on page 30 of the October, 1982 edition entitled "Detroit Report - Remember CVT" clearly shows that there is a pressing need for continuously variable transmissions in the automotive environment.

The combinations of the cone-shaped gear in conjunction with a flexible chain drive to achieve a driving means has been taught in U.S. Pat. Nos. 2,714,825 to L. Ferrari and 3,659,472 to this applicant.

It is an objective of applicant's invention to provide simple, reliable and yet economical means for varying the speeds of power shafts.

It is also an object of applicant's invention to provide chain receiving and driving means for continuously varying the speeds of shafts from a maximum speed of rotation in one direction through zero to a maximum speed of rotation in the opposite direction.

SUMMARY OF THE INVENTION

A chain receiving and driving, continuously variable speed transmission system comprising a pair of conical gears positioned so as to have their longitudinal axes parallel and the greater diameter of one conical gear or cone in proximity with the lesser diameter of the other conical gear or cone, a continuous flexible chain encompassing said pair of conical gears or cones longitudinally from end to end, and chain receiving means positioned within each of said conical gears or cones for cooperation with said chain so as to result in the driving of either conical gear or cone by the other.

DETAILED DESCRIPTION

Figure 1:
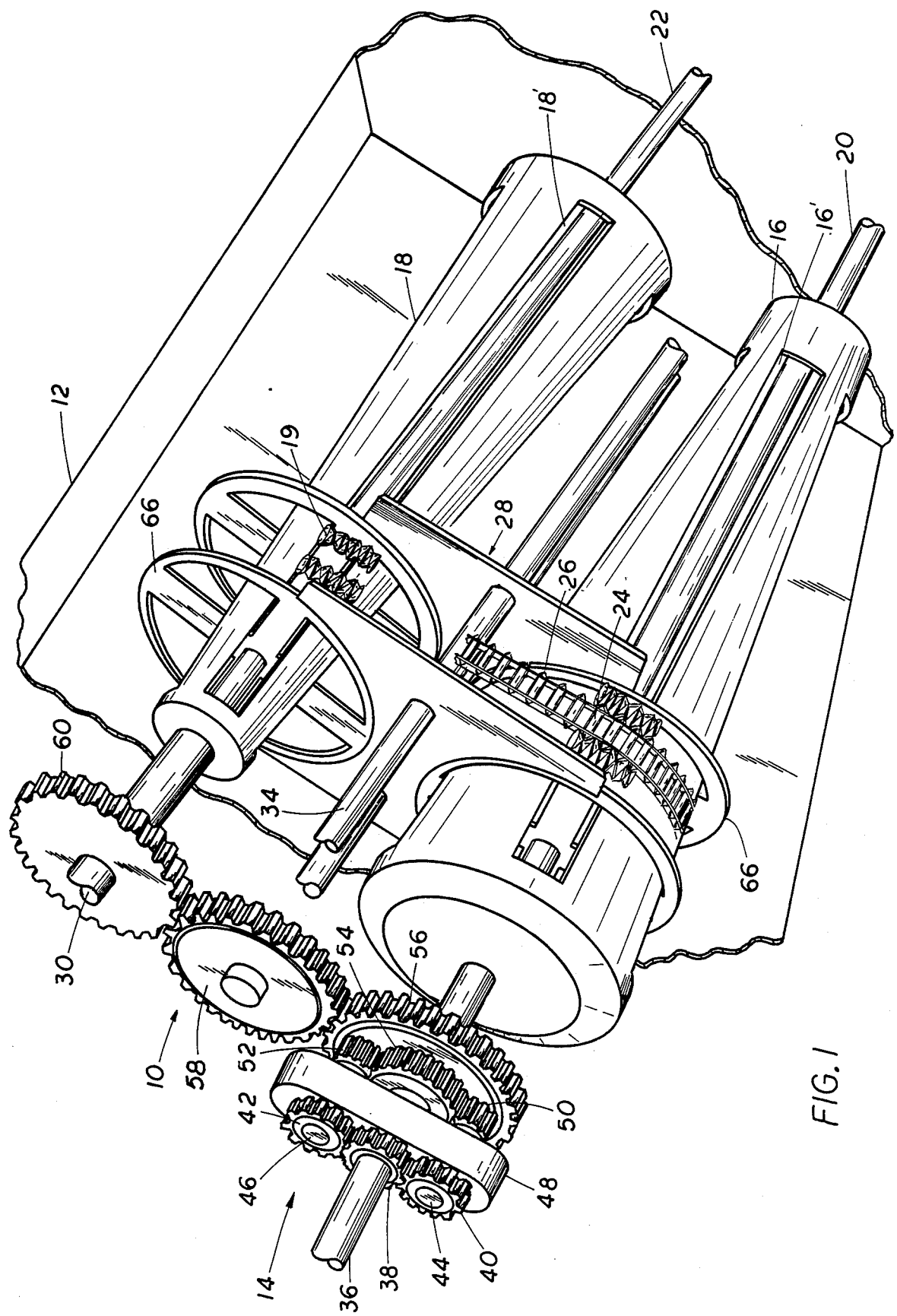
FIG. 1 is an isometric projection view of applicant's invention.

FIG. 1 shows an isometric projection of applicant's chain infinite and continuously receiving and driving variable speed transmission system 10 comprising frame means 12, constant speed input driving means 14, hollow cones or conical gears 16 and 18 having grooves 16' and 18' extending longitudinally along their surfaces parallel to longitudinal shafts 20,22, which are parallel to each other and which lie within the same plane for operation with the end of the peripheral surface of one cone having the largest circumference positioned proximate to the end of the peripheral surface of the other cone having the smallest circumference, flexible chain receiving means 19 for driving said cones, a continuous flexible chain 24 encompassing said cones 16 and 18 for cooperation with said flexible chain receiving means, said flexible chain 24 having a plurality of protrusions 26 extending therefrom, sliding means 28 providing for the movement of said continuous flexible chain 24 and said flexible chain receiving means 19 along grooves 16' and 18', variable idler shaft means 30, gear 60 keyed to shaft 30 for driving idler gear 58, which in turn drives gear 56, freely rotating on shaft 36, and which in turn drives gear 54 also freely rotating on shaft 36. Gears 54, 50, 52, bar 48, shafts 44 and 46, gears 40 and 42 comprise a planetary gear system operating around gear 38 to provide means for zero and reverse speeds as hereinafter described.

Frame means 12 may be an enclosure for containing all or part of the components and securing means such as guide bars 34 and shaft bearings (not shown).

Input driving means 14 includes driving shaft 36 having spur gear 38 and conical gear 16 keyed to it. The planetary gear arrangement essentially consisting of spur gears 40,42, meshed at diametrically opposite tangent points of gear 38 are keyed to shafts 44,46, which shafts rotate in bearings through bar 48, which in turn rotates around driven shaft 36, not being keyed thereto.

Gears 50,52 are keyed to the ends of shafts 44,46, opposite to gears 40,42, respectively and mesh with diametrically opposite tangential points of gear 54, that is coupled to gear 56, which meshes with idler gear 58, which in turn meshes with output gear 60, keyed to driven shaft 30.

Holding bar 48 fixed, and allowing gear 38 to make one clockwise revolution, results in one counterclockwise revolution in each of gears 40,42, or one half revolution of gears 40,42 are in a gear ratio of two to one relative to gear 38. Revolving gear 38 one counterclockwise revolution results in one clockwise revolution in each of gears 40,42 and a one half clockwise revolution of bar 48 if a gear ratio of two to one exists. Considering bar 48 relative to gears 50,52 and gear 54, holding bar 48 fixed and allowing gear 54 to make one clockwise rotation will result in one counterclockwise revolution in each of gears 50,52 or two revolutions if gears 50,52 are in a gear ratio of one to two relative to gear 54 since this gear arrangement is a mirror image of gears 40,42 and 38. Revolving gear 54 one counterclockwise revolution results in two clockwise revolutions in each of gears 50,52 and two revolutions of bar 48. Summation of all movements results in no movement of gear 54, if gear ratios of one to one existed to counterclockwise movements if the gear ratios were varied between two to one and one to two. Since gear 54 is coupled to gear 56, which is in turn coupled to gear 60, it is possible to continuously vary the output speed of rotation of bar 48 from those of very high speeds in one direction to very high speeds in the opposite direction by design considerations of the gear ratio of gears 38,40 and 42 as well as gears 54, 50 and 52. This capability of theoretically infinite speed in one direction slowing down to zero speed and then increasing to infinite speeds in the opposite direction without separate clutching devices is what is meant by an infinite continuously variable speed transmission system.

Substantially identical hollow cones 16 and 18 provide the positively driven variable speed transmission system by employing a continuous flexible chain that is positioned along the longitudinal axes of both cones for driving one of the cones and resulting in continuously varying the output speed of rotation of the output driving means (not shown) coupled to bar 48. Although the input shaft 36 is shown as driving cone 16, there is no reason why the constant speed input driving means could not be connected to bar 48 so as to drive cone 18 through the planetary gears 50, 52, 54, 56, 58, and 60, which in turn drives conical gear 16, which then drives shaft 36 at various speeds depending upon the position of the chain 24 to result in continuously varying the output speed of rotation of shaft 36.

Figure 2:
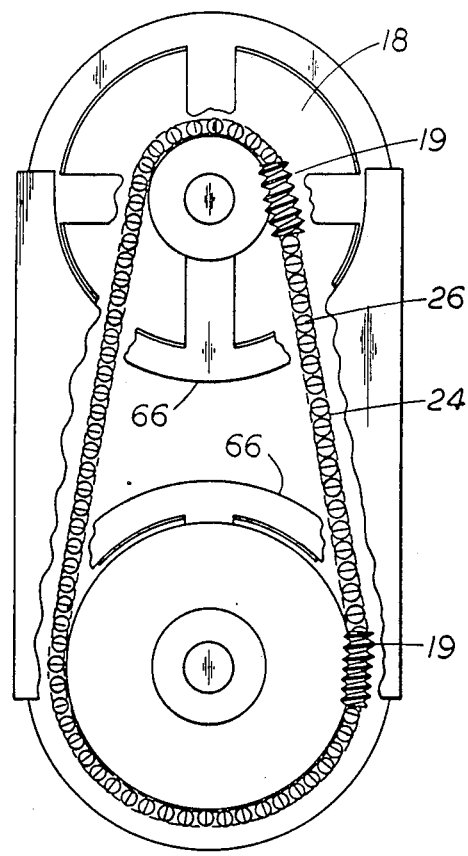
FIG. 2 is a front elevation view of a part of applicant's invention shown in FIG. 1.
Figure 3:
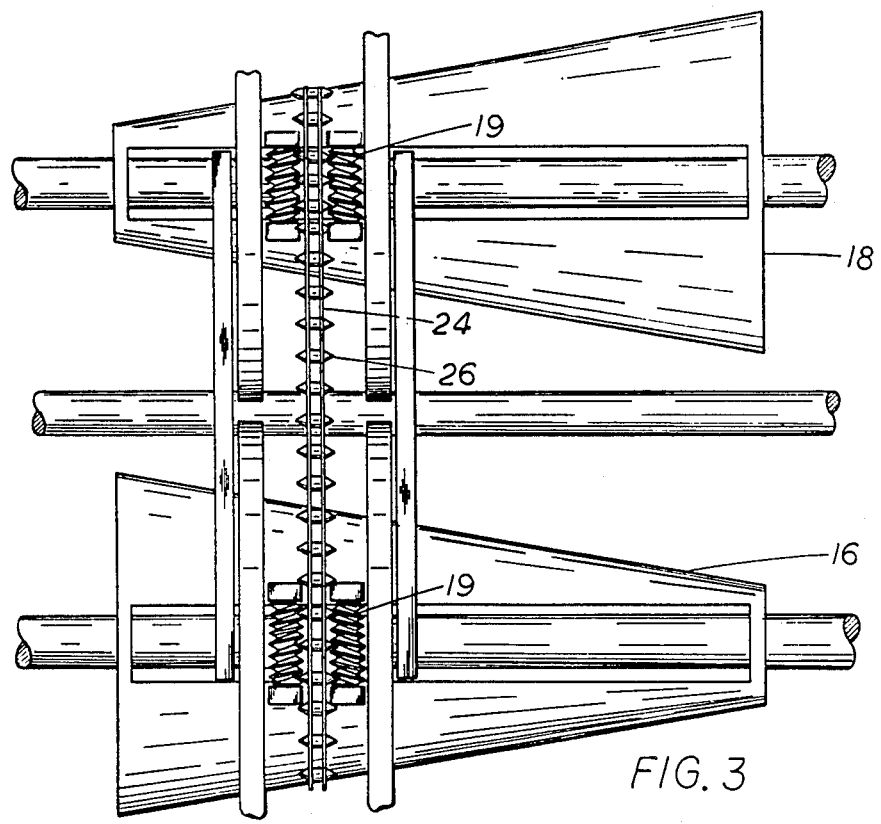
FIG. 3 is a side elevation view of the part of applicant's invention shown in FIG. 2.
Figure 4A:
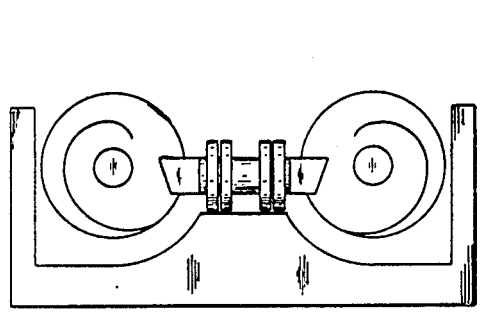
FIGS. 4 (a),(b) and (c) are front, side elevation and plan views respectively of an embodiment of the part of applicant's invention shown in FIG. 3 positioned within either cone and including a section of the modified flexible chain.
Figure 4B:
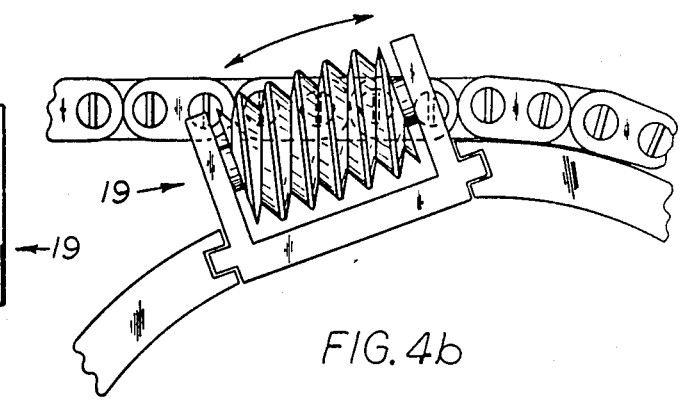
Figure 4C:
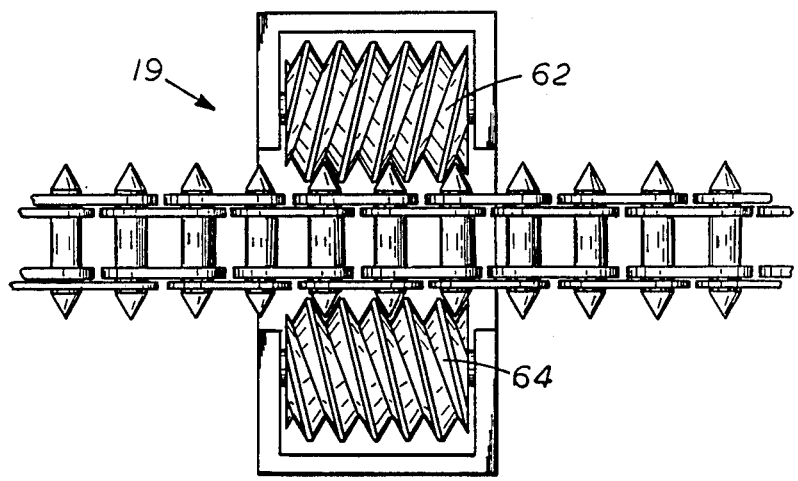

Referring to FIGS. 2 & 3, showing front and side elevation views of cones 16, 18 enclosed by flexible continuous chain 24 having protrusions 26, the problem of small variances in the length of the continuous chain as it is moved along the cones for varying the speed are solved by employing flexible chain receiving means 19, shown in detail in FIGS. FIGS. 4a, 4b, and 4c show front elevation view, a partial side elevation view and plane view of the flexible chain receiving means 19 having a pair of threaded freely rotating spiral gears or thimbles 62 & 64 mounted in an assembly. The Thimble 62 having a right hand thread and thimble 64 having a left hand thread which are made having angles compatible with the angles that are on the ends of the extended protrusions 26 of the chain to permit engagement and disengagement of chain 24. FIG. 4C shows a plan view of the chain receiving means 19 with the chain 24 positioned between the thimbles 62 and 64. As more clearly shown in FIG. 4C, the chain enters its receiving means 19 between the thimbles 62,64 and the thimbles freely turn on conventional shafts to align themselves with protrusions 26. The centers of both thimbles and chain are substantially in line so that the thimbles will not turn once the protrusion 26 is engaged, thereby locking the chain and thimbles and resulting in the chain driving the cone or being driven by the cone.

Sliding means 28 includes a pair of spoked wheels 66 whose spokes have been modified to accomodate each of the cones and which modified spoke wheels are joined together by a frame having aperatures for permitting sliding means 28 to move on guide bars 34. The sliding means provides means for the movement of the flexible chain 24 and chain receiving means 19 from one end of the cones to the other end.

Operation of applicant's infinite, and continuously driven and receiving variable speed transmission system is as follows: The input driving shaft 36, in addition to turning gear 38 and initiating the planetary gearing, as described in the foregoing paragraphs, drives cone 16 which is keyed to it, and this in turn drives flexible chain 24 through the chain receiving means 19 in grove 16', which in turn drives cone 18 at the speed determined by the position of the flexible chain 24 and chain receiving means 19 in groove 18'. If the sliding means 28 is at a position where the diameter and therefore the circumference of cone 16 is greater than the diameter and therefore circumference of cone 18, the speed of cone 18 will be proportionately higher. If the sliding means 28 is at the other end of cone 16 where its diameter and therefore circumference is smaller than the diameter and therefore circumference of cone 18, the speed of cone 18 will be proportionately slower. The greater speed will obviously occur at the end of cone 16 having the greatest diameter and the slowest speed will occur at the end of cone 16 having the smallest diameter. The direction of rotation of cone 18, which drives bar 48 through gears 60, 58, and the planetary gear system is determined by the design of the planetary gearing as discussed in the preceding paragraphs.

Although only one embodiment of applicant's invention has been disclosed, the invention should not be so limited as other embodiments comprising any number of grooves 16', 18', protrusion shapes and output take offs of the driven shafts, may be employed by this invention. This invention is to be limited only by the scope and breadth of the annexed claims:

I claim:

1. A chain driven and receiving, continuously infinite variable speed transmission system comprising frame means, input driving means rotatably mounted within said frame means, a planetary gear system incorporating means for zero and reverse rotation of said input driving means within said frame means and coupled to said input driving means, a first hollow cone coupled to said input driving means for rotation within said frame means, a second hollow cone having means for rotation within said frame means, longitudinal axes of said cones being parallel and lying in the same plane and positioned to operate with the end of the peripheral surface having the largest circumference of each cone proximate to the end of the peripheral surface having the smallest circumference of the other cone, a plurality of chain receiving means or each cone having means for movement along the longitudinal axes of each cone, a continuous flexible chain fabricated of individual links having protrusions extending out of said links for engaging said chain receiving means encompassing said cones for driving said cones or being driven by said cones, said chain receiving means for engaging said continuous flexible chain comprising a pair of threaded freely rotating spiral gears having threads for engaging said protrusions extending out of said links of said flexible chain, means for positioning said chain and chain receiving means anywhere between the opposite ends of said cones, and variable speed output means coupled to said input driving means and said second cone through said planetary gear system.

2. A chain driven and receiving, continuously infinite variable speed transmission system as claimed in claim 1 wherein said planetary gear systems incorporating means for zero and reverse rotations comprise a rotatable bar for transmitting the variable speed output from said driven cone, a first gear keyed to an input shaft, a substantially identical pair of second gears meshed to said first gear at diametrically opposite tangent points and keyed to a pair of first shafts that rotatably pass through opposite ends of said bar, the diameters of said first and pair of second gears being determined for producing a first resultant rotation of said bar relative to said first gear, a substantially identical pair of third gears keyed to said pair of first shafts at ends opposite to those at which said pair of second gears are keyed, a fourth gear positioned to freely rotate around said input shaft and meshed at diametrically opposite tangential points with said pair of third gears, the diameters of said pair of third gears and said fourth gear being determined for producing a second resultant rotation of said bar relative to said fourth gear and therefore relative to said first resultant rotation producing a cancelling and reversing rotation, a fifth gear positioned to freely rotate around said input shaft and directly coupled to said fourth gear, a sixth gear rotatably positioned within said frame means and meshed with said fifth gear, and a seventh gear keyed to the shaft of said second cone and meshed with said sixth gear, resulting in cancelling and reversing rotation of said bar relative to said input shaft.

3. A chain driven, continuously infinite variable speed transmission system as claimed in claim 1 wherein said first and second cones are substantially identical.

4. A chain driven and receiving, continuously infinite variable speed transmission system as claimed in claim 1 wherein said means for positioning said chain and chain receiving means anywhere on the peripheral surface between opposite ends of said cones comprise a pair of spaced apart spoked wheels having apertures for movement, a frame joining said pairs of spoked wheels, and guide rods passing through said frame for securing said means for positioning said chain and chain receiving means to said frame means.

5. A chain driven and receiving, continuously infinite variable speed transmission system as claimed in claim 1 wherein said first and second cones have a plurality of longitudinal grooves in their outer peripheral surfaces, one groove for each chain receiving means.

6. A chain driven continuously variable speed transmission system comprising frame means, input driving means for rotation within said frame means, a first conical gear coupled to said input driving means, a second conical gear having its longitudinal axis parallel to the longitudinal axis of said first conical gear and lying in the same plane as that of said first conical gear with the end of the second conical gear having the largest diameter positioned in relative proximity to the end of said first conical gear having the smallest diameter, and the end of said second conical gear having the smallest diameter positioned proximate to the end of the first conical gear having the largest diameter, a continuous flexible chain having pins extending therefrom and encircling said first and second gears and being driven by said first conical gear to drive said second conical gear, a plurality of flexible chain receiving means comprising spiral gears within said first and second conical gears engaged by said pins extending from said flexible chain and an output shaft coupled to said second conical gear for transmitting power to a load.

7. A chain driven, continuously variable speed transmission system as claimed in claim 6 wherein said first and second conical gears are substantially identical.

8. A chain driven, continuously variable speed transmission system as claimed in claim 6 further comprising sliding means for positioning said flexible chain anywhere on the first and second conical gear surfaces.

* * * * *